(12) United States Patent
Wang et al.

(10) Patent No.: US 10,059,879 B2
(45) Date of Patent: Aug. 28, 2018

(54) LIQUID CRYSTAL COMPOSITION, PATTERNED PHASE DELAY FILM AND PREPARATION METHOD THEREOF, AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Feifei Wang, Beijing (CN); Xibin Shao, Beijing (CN); Dan Wang, Beijing (CN); Seungmin Lee, Beijing (CN); Honglin Zhang, Beijing (CN); Hebin Zhao, Beijing (CN); Ting Dong, Beijing (CN); Yingying Qu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 11 days.

(21) Appl. No.: 14/894,798

(22) PCT Filed: Jun. 18, 2015

(86) PCT No.: PCT/CN2015/081730
§ 371 (c)(1),
(2) Date: Nov. 30, 2015

(87) PCT Pub. No.: WO2016/095465
PCT Pub. Date: Jun. 23, 2016

(65) Prior Publication Data
US 2016/0355733 A1 Dec. 8, 2016

(30) Foreign Application Priority Data
Dec. 15, 2014 (CN) .......................... 2014 1 0779593

(51) Int. Cl.
*C09K 19/38* (2006.01)
*G02F 1/1335* (2006.01)
(Continued)

(52) U.S. Cl.
CPC ...... *C09K 19/3814* (2013.01); *C09K 19/2007* (2013.01); *C09K 19/3809* (2013.01);
(Continued)

(58) Field of Classification Search
None
See application file for complete search history.

(56) References Cited

U.S. PATENT DOCUMENTS

2003/0104144 A1* 6/2003 Hammond-Smith ....................... C09K 19/38
428/1.21
2005/0151906 A1 7/2005 Yoshimi et al.
(Continued)

FOREIGN PATENT DOCUMENTS

CN 1650198 A 8/2005
CN 1841157 A 10/2006
(Continued)

OTHER PUBLICATIONS

English Translation of JP2003147363.*
(Continued)

*Primary Examiner* — Cynthia H Kelly
*Assistant Examiner* — Anna Malloy
(74) *Attorney, Agent, or Firm* — Harness, Dickey & Pierce, P.L.C.

(57) ABSTRACT

A liquid crystal composition comprises a photo-polymerizable liquid crystal mixture and a heat-polymerizable liquid crystal mixture, and the two mixtures have opposite rotatory directions. A patterned phase delay film is prepared from the liquid crystal composition. A display device comprises the
(Continued)

phase delay film. The preparation of the patterned phase-delay film can be implemented by a two-step polymerization process including UV-polymerization and heat-polymerization. The process is simple and the costs are low.

16 Claims, 2 Drawing Sheets

(51) Int. Cl.

| | | |
|---|---|---|
| *C09K 19/58* | (2006.01) | |
| *G02B 5/30* | (2006.01) | |
| *C09K 19/54* | (2006.01) | |
| *G02F 1/1333* | (2006.01) | |
| *G02F 1/1341* | (2006.01) | |
| *C09K 19/20* | (2006.01) | |
| *C09K 19/04* | (2006.01) | |
| *C09K 19/32* | (2006.01) | |

(52) U.S. Cl.
CPC .......... *C09K 19/3852* (2013.01); *C09K 19/54* (2013.01); *C09K 19/586* (2013.01); *G02B 5/3016* (2013.01); *G02B 5/3083* (2013.01); *G02F 1/1335* (2013.01); *G02F 1/1341* (2013.01); *G02F 1/133382* (2013.01); *C09K 2019/0448* (2013.01); *C09K 2019/2042* (2013.01); *C09K 2019/2078* (2013.01); *C09K 2019/323* (2013.01); *C09K 2219/03* (2013.01)

(56) References Cited

U.S. PATENT DOCUMENTS

| | | | |
|---|---|---|---|
| 2006/0222783 A1 | 10/2006 | Hayashi et al. | |
| 2011/0086185 A1* | 4/2011 | Ootsuki | C07D 303/24 428/1.3 |
| 2012/0050631 A1* | 3/2012 | Ohmuro | G02F 1/133788 349/33 |
| 2012/0099039 A1 | 4/2012 | Haseba et al. | |
| 2016/0355733 A1 | 12/2016 | Wang et al. | |

FOREIGN PATENT DOCUMENTS

| | | | |
|---|---|---|---|
| CN | 101225308 A | | 7/2008 |
| CN | 102071031 A | | 5/2011 |
| CN | 102388013 A | | 3/2012 |
| CN | 102634348 A | | 8/2012 |
| CN | 102778718 A | * | 11/2012 |
| CN | 103275736 A | | 9/2013 |
| CN | 104403677 A | | 3/2015 |
| EP | 1295929 | | 3/2003 |
| JP | 2003147363 A | * | 5/2003 |
| JP | 2005-113131 A | | 4/2005 |
| JP | 2013-037356 A | | 2/2013 |

OTHER PUBLICATIONS

English Translation of CN102778718.*
Guo et al., "Bandwidth-controllable reflective cholesteric gels from photo- and thermally-induced processes", Mar. 2010, Liquid Crystals, vol. 37, No. 3, 311-316.*
English Translation of CN101225308.*
English Translation of CN102071031.*
International Search Report (ISR) from PCT/CN2015/081730 dated Aug. 26, 2015.
Written Opinion of the International Searching Authority from PCT/CN2015/081730 dated Aug. 28, 2015.
Office Action from corresponding Chinese Patent Application No. 201410779593.6 dated Dec. 28, 2015.

* cited by examiner

LIQUID CRYSTAL COMPOSITION, PATTERNED PHASE DELAY FILM AND PREPARATION METHOD THEREOF, AND DISPLAY DEVICE

TECHNICAL FIELD

The present invention relates to the field of display technology, and particularly relates to a liquid crystal composition, a patterned phase delay film prepared from the liquid crystal composition and preparation method thereof, and a display device comprising the phase delay film.

BACKGROUND

3D Technology comprises polarized 3D technology and Shutter Glass (SG) technology (also known as shutter 3D technology). Currently, glasses with polarization function in the polarized 3D technology need to be installed in a Liquid Crystal Display (LCD) module, which makes the cost relatively high and becomes the main factor that limits its application. However, Film-type Patterned Retarder (FPR) technology developed by LG Display utilizes films as substitutes of the glasses, which allows the costs to be reduced by three quarters and achieves a strong competitiveness in price.

Conventional FPR preparation processes are relatively complex. First of all, it requires coating with an alignment liquid. After drying, an alignment film having two different rotatory directions distributed at intervals from each other is prepared using polarizing ultraviolet light. Thereafter, a liquid crystal layer is coated on the alignment film, and the effect of the alignment film allows the liquid crystal layer to have different rotatory directions in adjacent lines. Then a FPR film is obtained by polymerization with ultraviolet light.

SUMMARY

Embodiments of the present invention are directed to the problem that the preparation process of a patterned phase delay film in the prior art is complex, and provide a liquid crystal composition, a patterned phase delay film prepared from the liquid crystal composition and preparation method thereof, and a display device comprising the phase delay film.

According to one aspect of the present invention, there is provided a liquid crystal composition which comprises a photo-polymerizable liquid crystal mixture and a heat-polymerizable liquid crystal mixture. The photo-polymerizable liquid crystal mixture and the heat-polymerizable liquid crystal mixture have opposite rotatory directions.

In an embodiment, a mass ratio of the photo-polymerizable liquid crystal mixture to the heat-polymerizable liquid crystal mixture is 1: (0.4-3).

In an embodiment, the photo-polymerizable liquid crystal mixture comprises a small molecule nematic liquid crystal, a photo-polymerizable monomer, a UV-absorbing dye, a chiral additive and a photoinitiator.

In an embodiment, assume that total mass of the photo-polymerizable liquid crystal mixture is 100%, the photo-polymerizable liquid crystal mixture comprises 28-69.5% of small molecule nematic liquid crystal, 15-40% of photo-polymerizable monomer, 2-15% of UV-absorbing dye, 0-25% of chiral additive and 0.5-5% of photoinitiator.

The photo-polymerizable monomer may either be a photo-polymerizable liquid crystal monomer or a non-liquid crystal photo-polymerizable monomer. In an embodiment, the photo-polymerizable liquid crystal monomer may include any one of the following substances:

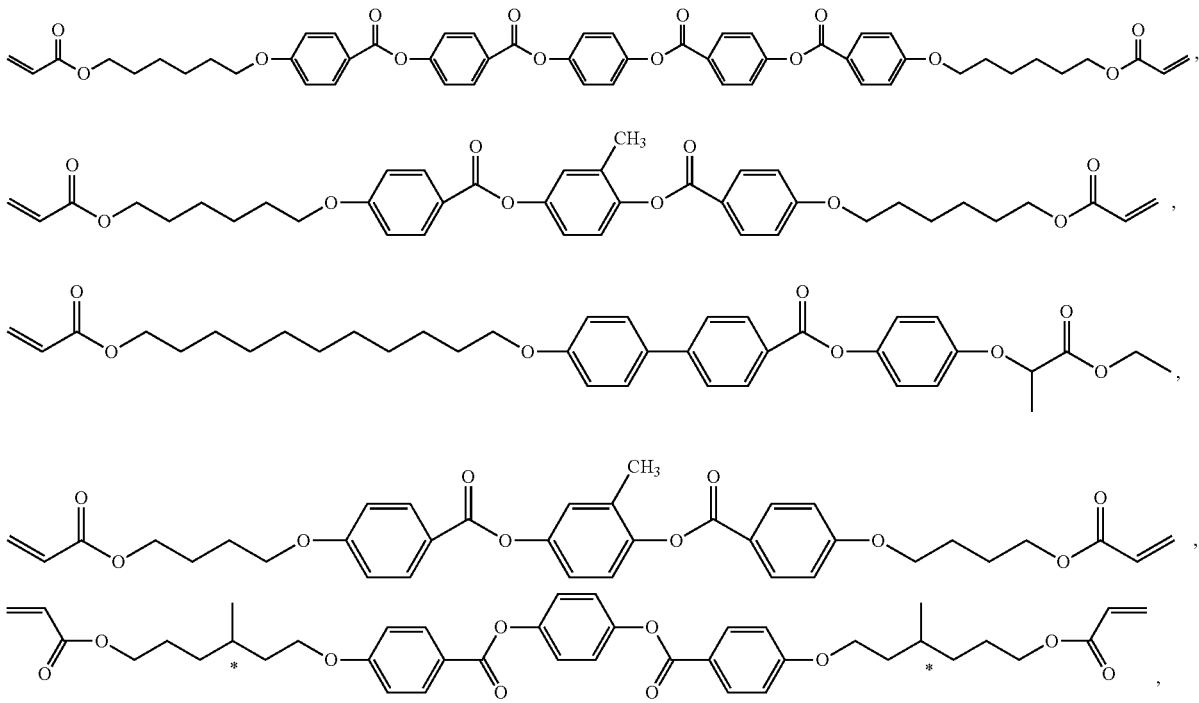

and

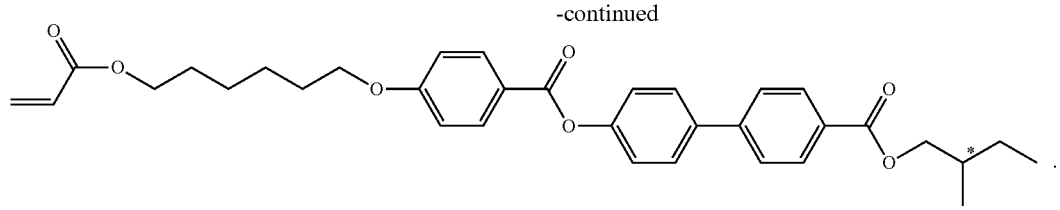

In an embodiment, the UV-absorbing dye includes:

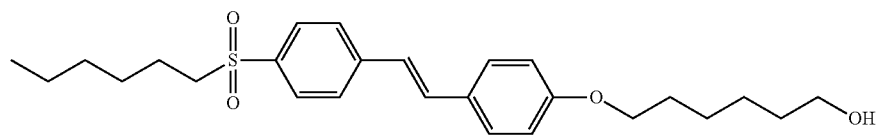 [SMILES: CCCCCCS(=O)(=O)c1ccc(/C=C/c2ccc(OCCCCCCO)cc2)cc1]

In an embodiment, the photoinitiator includes:

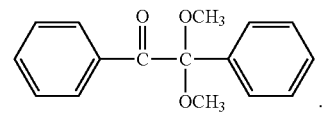 [SMILES: COC(OC)(C(=O)c1ccccc1)c1ccccc1]

In an embodiment, the heat-polymerizable liquid crystal mixture comprises a small molecule nematic liquid crystal, a heat-polymerizable monomer, a curing agent and a chiral additive.

In an embodiment, assume that total mass of the heat-polymerizable liquid crystal mixture is 100%, the heat-polymerizable liquid crystal mixture comprises 35-73% of small molecule nematic liquid crystal, 10-20% of heat-polymerizable monomer, 12-20% of curing agent and 5-25% of chiral additive.

In an embodiment, the heat-polymerizable monomer includes a bisphenol F epoxy resin having the following molecular formula:

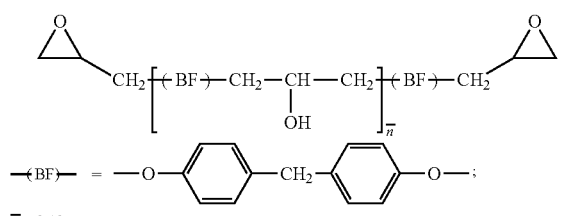

$\bar{n} = 0.13$ or a polyethylene glycol bisglycidyl ether having the following molecular formula:

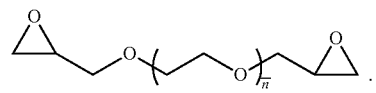

$\bar{n} = 3.45$

In an embodiment, the curing agent includes 1,8-diamino-3,6-dioxaoctane having the following molecular formula:

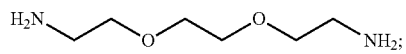

or 4,4'-diaminodicyclohexylmethane having the following molecular formula:

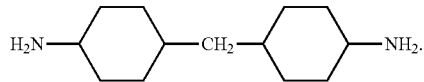

In an embodiment, the chiral additive includes any one of the following substances:

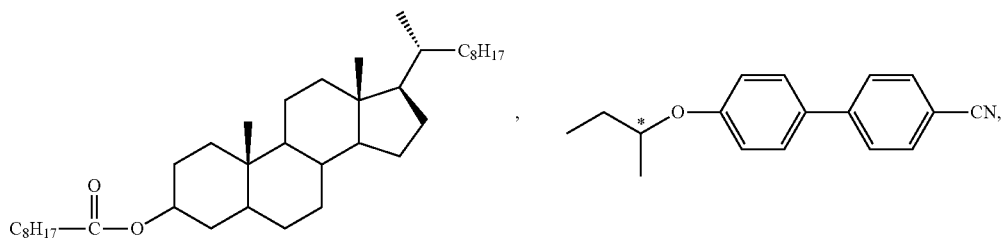

-continued

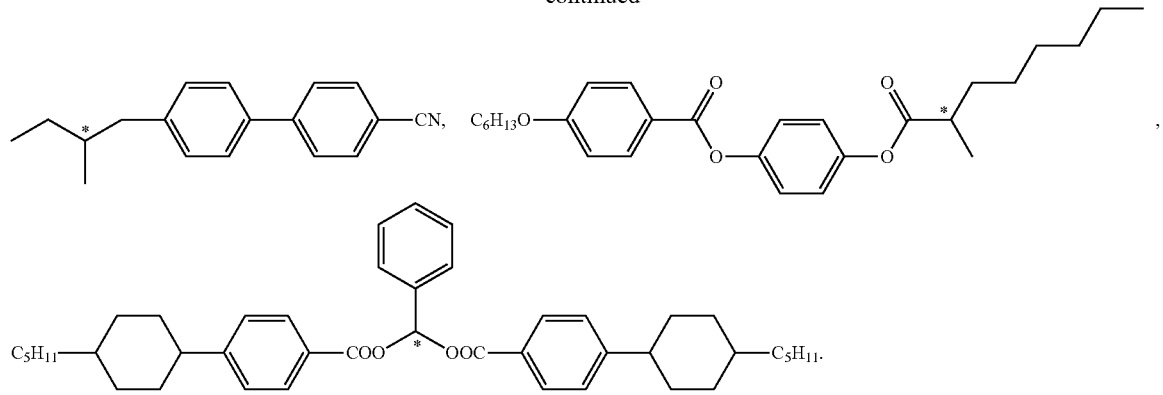

With the liquid crystal composition of the embodiments of the present invention, a patterned phase delay film with high reflectance and transmittance can be obtained by UV-polymerizing and heat-polymerizing the liquid crystal composition. The preparation process is simple and the costs are low.

According to another aspect of the present invention, there is provided a patterned phase delay film which is prepared from the above-mentioned liquid crystal composition.

According to another aspect of the present invention, there is provided a preparation method for a patterned phase delay film, which comprises the following steps: injecting the above mentioned liquid crystal mixture into a liquid crystal cell; irradiating the liquid crystal cell covered with a photo mask with UV light to complete UV-polymerization; and heating the liquid crystal cell to complete heat-polymerization.

A person skilled in the art will appreciate that appropriate conditions for UV-polymerization and heat-polymerization may be selected in accordance with specific components of the liquid crystal composition and performance requirements on the obtained phase delay film.

In an embodiment, the condition for the UV-polymerization is wavelength of the UV light being 365 nm, intensity being 0.001-100 mW/cm$^2$, and irradiation time being 5-240 min.

In an embodiment, the condition for the heat-polymerization is temperature ranging from 30 to 120° C. and heating time ranging from 20 to 60 min.

According to another aspect of the present invention, there is provided a display device which comprises the above mentioned patterned phase delay film.

Since the display device comprises the above mentioned patterned phase delay film, it can be used in 3D display with the advantages of simple preparation, low costs, and the like.

DETAILED DESCRIPTION

To facilitate those skilled in the art to well understand the concept of the present invention, several embodiments of the present invention will be described in detail in conjunction with the drawings.

In one embodiment of the present invention, a liquid crystal composition is provided which comprises a laevorotatory photo-polymerizable liquid crystal mixture and a dextrorotatory heat-polymerizable liquid crystal mixture.

In another embodiment of the present invention, a liquid crystal composition is provided which comprises a dextrorotatory photo-polymerizable liquid crystal mixture and a laevorotatory heat-polymerizable liquid crystal mixture.

The photo-polymerizable liquid crystal mixture and heat-polymerizable liquid crystal mixture may comprise the previously mentioned various specific components. It should be understood that it is also possible to mix any other heat-polymerizable liquid crystal mixture and photo-polymerizable liquid crystal mixture in the prior art, as long as the optically rotatory directions of the two mixtures are opposite.

The photo-polymerizable liquid crystal mixture or heat-polymerizable liquid crystal mixture may comprise a small molecule nematic liquid crystal. In some embodiments, a liquid crystal temperature of the small molecule nematic liquid crystal ranges from −20° C. to 120° C., and an optical anisotropy Δn ranges from 0.19 to 0.21 (589 nm, 293K), e.g., SLC1717 (Shijiazhuang Yongshenghuaqing Liquid Crystal LTD.), MAT 10-1614 (Merck Corporation), ZBE-5371XX (JNC Corporation), and the like.

In one embodiment of the present invention, a patterned phase delay film is provided which is prepared from the above-mentioned liquid crystal composition. The preparation method comprises the following steps: injecting the above mentioned liquid crystal composition into a liquid crystal cell; irradiating the liquid crystal cell covered partially with a photo mask with UV light to complete the UV-polymerization; and heating the liquid crystal cell to complete the heat-polymerization so as to form the patterned phase delay film.

Specifically, the liquid crystal composition can be obtained by uniformly mixing the photo-polymerizable liquid crystal mixture and heat-polymerizable liquid crystal mixture by means of solvent evaporation or heat melting. The solvent evaporation and heat melting are conventional approaches. For the solvent evaporation, the solvent is usually selected from organic solvents, such as tetrahydrofuran, acetone, dichloromethane, or the like. For the heat melting, the liquid crystal composition can be heated to its clearing point temperature to carry out the melt mixing. The specific operation conditions will not be repeated here.

Figure 1:
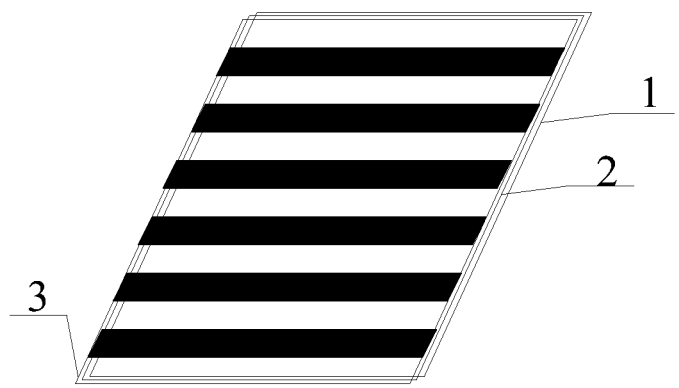
FIG. 1 is a schematic diagram of the liquid crystal cell covered with a mask plate in a first embodiment of the present invention.

Then referring to FIG. 1, the liquid crystal composition is injected into the liquid crystal cell 2 on the glass substrate 1, and the photo mask 3 is placed on the liquid crystal cell 2. The photo mask 3 may be a photo shielding strip arranged at intervals. The liquid crystal cell 2 may be irradiated with UV light at a wavelength of 365 nm, under an irradiation intensity of 0.001-100 mW/cm$^2$ for 5-240 min. In some embodiments, the irradiation intensity of the UV light is 0.1-15 mW/cm$^2$ and the irradiation time is 10-100 min.

The concentration gradient of the photo-polymerizable monomer may be represented by a polymerization rate difference in the photo-polymerizable monomer polymerization. In the direction vertical to the polymer network (i.e. the direction vertical to the glass substrate 1 in the liquid crystal cell), the polymerization rate is faster at the side near the UV light, which causes the photo-polymerizable monomers away from the UV light and those at the place covered by the photo mask 3 to migrate to the side near the UV light. Most of the photo-polymerizable monomers may migrate to the light permeable region of the photo mask 3. The polymer network formed near the UV light is more intensive than that formed away from the UV light. That is, in the direction vertical to the polymer network (i.e. the direction vertical to the glass substrate 1 in the liquid crystal cell), the concentration gradient of the polymer network of photo-polymerizable monomers is formed. Moreover the photo-polymerizable monomers at the place covered by the photo mask 3 may migrate to the side near the UV light, so the concentration gradient of the polymer network of photo-polymerizable monomers is also formed in the horizontal direction of the liquid crystal cell.

Thus the photo-polymerizable liquid crystal monomers at the place of the liquid crystal cell 2 irradiated with the UV light are polymerized during the migration, and after the polymerization, a concentration gradient polymer network of photo-polymerizable monomers is formed at the place of the liquid crystal cell 2 irradiated with the UV light. The rotatory direction of the concentration gradient polymer network may be determined by the contents and optical rotation of the chiral substances in the system. So the system exhibits levorotation if the content of the laevorotatory substance is higher, and the network after polymerization is a laevorotatory network. If the content of the dextrorotatory substance is higher in the system, the system exhibits dextrorotation, and the network after polymerization is a dextrorotatory network.

Then the UV-polymerized liquid crystal cell is placed on a heating platform for heating, so that the heat-polymerizable monomers in the liquid crystal composition are polymerized. The temperature of the heating platform may be 30° C.-120° C., and the heat curing time may be 20-60 min. In some embodiments, the temperature of the heating platform may be 80° C.-100° C., and the heat curing time may be 40-50 min.

The polymerization of heat-polymerizable monomers takes place when the temperature reaches the heat initiation temperature. Pure UV light irradiation would not lead to the heat-polymerization. In addition, in the step of UV light irradiation, since the difference of the polymerization rates of the photo-polymerizable monomers may cause the photo-polymerizable monomers to move to the direction with the stronger UV light, a majority of the heat-polymerizable monomers will be passively migrated (in the opposite direction), and the concentration gradient of heat-polymerizable monomers may be also formed. The content of heat-polymerizable monomers is lower near the place where the UV light is stronger, while the content of heat-polymerizable monomers is higher at the place where the UV light is weaker and the place covered by the photo mask 3, so the most of the heat-polymerizable monomers are migrated to the place covered by the photo mask, and thus the concentration gradient of heat-polymerizable monomers is formed opposite to the concentration gradient of photo-polymerizable monomers. That is, the concentration gradient of heat-polymerizable monomers is also formed in both the horizontal direction and vertical direction of the liquid crystal cell. During the heating, the concentration gradient of the polymer network of heat-polymerizable monomers is also formed in both the horizontal direction and vertical direction of the liquid crystal cell. Similarly, as the rotatory direction of the concentration gradient polymer network is determined by the contents and optical rotation of the chiral substances in the system, the system exhibits levorotation if the content of the laevorotatory substance is higher and the network after polymerization is a laevorotatory network, and if the content of the dextrorotatory substance is higher, the system exhibits dextrorotation, and the network after polymerization is a dextrorotatory network.

Figure 3:
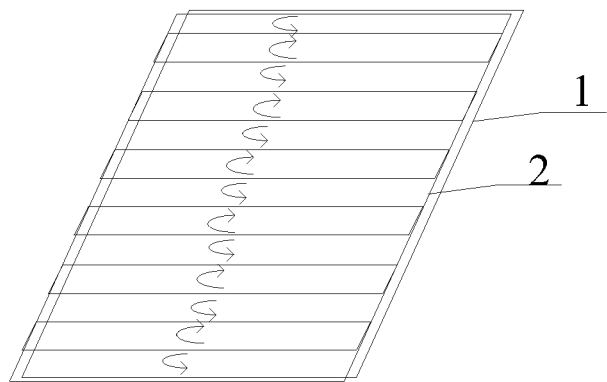
FIG. 3 is a schematic diagram of the region formed by heating which reflects dextrorotatory visible light band in the first embodiment of the present invention.

In addition, the heat-polymerizable monomers remained at the exposed place of the photo mask (i.e. the irradiated place of the photo mask) are polymerized upon heating. But the heat-polymerizable monomers remained at the exposed place of the photo mask (with lower contents) are not sufficient to change the optical rotation of the polymer network of photo-polymerizable monomers which has higher contents. After the polymerization, the heat-polymerizable monomers function to further stabilize the laevorotatory polymer network which is formed previously from the photo-polymerizable monomers. As shown in FIG. 3, the patterned phase delay film may be finally formed which may reflect laevorotatory polarized light and dextrorotatory polarized light at different positions. The laevorotatory and dextrorotatory polarization states may be separately distributed at intervals in accordance with the shape of the photo mask, that is, linear polarized lights of the same polarization state emitted from the adjacent pixel lines of the display panel may be converted into laevorotatory circular polarized lights and dextrorotatory circular polarized lights respectively.

Moreover the concentration gradients of polymer networks may be formed in the different regions (i.e. the covered region and the exposed region of the mask), i.e., helical pitch gradients of a cholesteric liquid crystal composite system.

The helical pitch gradients of the cholesteric liquid crystal composite system correspond to the selective reflection bandwidth range. The corresponding relation may comply with the Bragg reflection formula: $\Delta\lambda=\Delta n\times\Delta p$, wherein $\Delta\lambda$ is the selective reflection bandwidth, $\Delta n$ is the liquid crystal birefringence, and $\Delta p$ is the helical pitch gradient of the liquid crystal composite system. Thus the different regions may reflect the lights of the corresponding bandwidth ranges.

In one embodiment of the present invention, a patterned phase delay film is provided which may be prepared from the liquid crystal composition according to the embodiments of the present invention by the above-mentioned preparation method. The patterned phase delay film may have the advantages of simple preparation process and low cost.

In one embodiment of the present invention, a display device is provided which comprises the above-mentioned patterned phase delay film. Since the display device is configured with the above-mentioned patterned phase delay film, it can be used in 3D display.

Embodiment 1

The present embodiment provides the liquid crystal composition which comprises the laevorotatory photo-polymerizable liquid crystal mixture and the dextrorotatory heat-polymerizable liquid crystal mixture. The amounts of the components contained in the two mixtures as well as their mixing mass ratio are shown in Table 1.

The laevorotatory photo-polymerizable liquid crystal mixture may comprise SLC1717 (Shijiazhuang Yongshenghuaqing Liquid Crystal LTD.) as the small molecule nematic liquid crystal, the photo-polymerizable liquid crystal monomer having the molecular formula of:

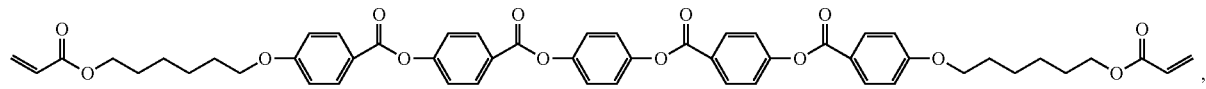 [SMILES: C=CC(=O)OCCCCCCOc1ccc(C(=O)Oc2ccc(C(=O)Oc3ccc(OC(=O)c4ccc(OC(=O)c5ccc(OCCCCCCOC(=O)C=C)cc5)cc4)cc3)cc2)cc1]

the UV-absorbing dye having the molecular formula of:

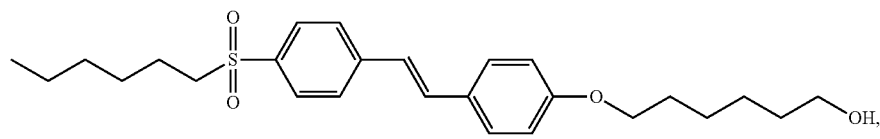 [SMILES: CCCCCCS(=O)(=O)c1ccc(/C=C/c2ccc(OCCCCCCO)cc2)cc1]

the chiral additive having the molecular formula of:

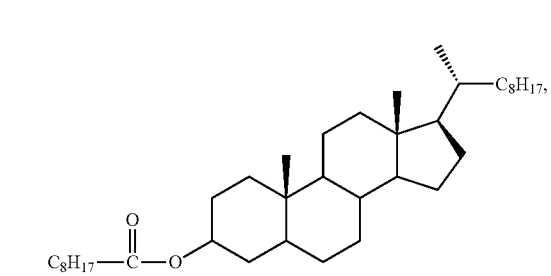

and
the photoinitiator having the molecular formula of:

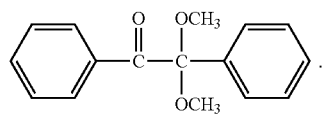 [SMILES: COC(OC)(C(=O)c1ccccc1)c1ccccc1]

The dextrorotatory heat-polymerizable liquid crystal mixture may comprise SLC1717 as the small molecule nematic liquid crystal, a bisphenol F epoxy resin as the heat-polymerizable monomers having the following molecular formula:

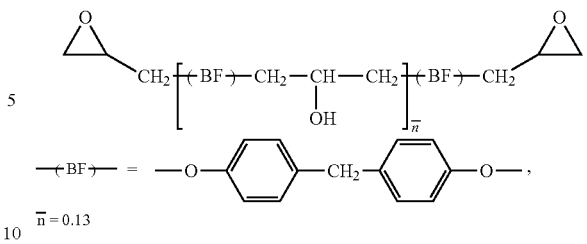

4,4'-diaminodicyclohexylmethane as the curing agent having the following molecular formula:

$H_2N-\!\!\bigcirc\!\!-CH_2-\!\!\bigcirc\!\!-NH_2,$ and
the chiral additive having the following molecular formula:

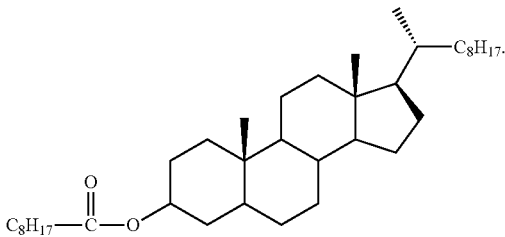

The laevorotatory photo-polymerizable liquid crystal mixture and dextrorotatory heat-polymerizable liquid crystal mixture may be mixed into a uniform mixture according to the mixing mass ratio of Table 1 by means of solvent evaporation, thereby obtaining a liquid crystal composition, wherein the total mass of the photo-polymerizable liquid crystal mixture is 1 gram, and the total mass of the heat-polymerizable liquid crystal mixture is 1 gram. The mass of each component in the photo-polymerizable liquid crystal mixture may be calculated according to the mass percentage in Table 1, and the corresponding mass of each component is weighed. The respective components may be placed into a 5 ml glass bottle. Acetone may be added slowly, dropwise into the glass bottle until the components are completely dissolved. Subsequently, the glass bottle may be placed on a heating platform of 40° C. for 5-6 hours until the solvent evaporates completely, and the formulation of the photo-polymerizable liquid crystal mixture is finished. Then, the heat-polymerizable liquid crystal mixture may be formulated according to the same process.

As shown in FIG. 1, the above-mentioned liquid crystal mixtures may be injected into the liquid crystal cell 2 on the glass substrate 1, and the photo mask 3 may be placed on the prepared liquid crystal cell 2. The pattern of the photo mask 3 may be photo shielding strips arranged at intervals.

The liquid crystal cell 2 may be irradiated with UV light at a wavelength of 365 nm, under an irradiation intensity of 1.4 mW/cm$^2$, for 25 minutes.

Figure 2:
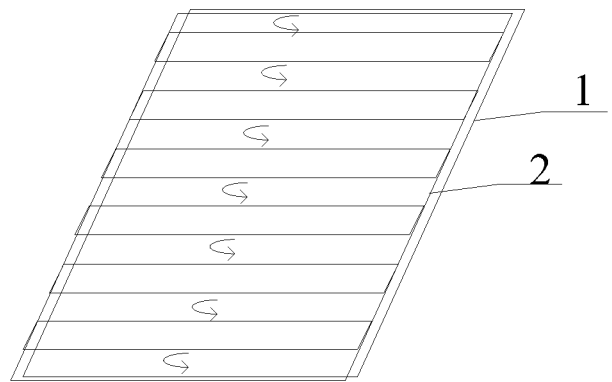
FIG. 2 is a schematic diagram of the region formed by UV radiation which reflects laevorotatory visible light band in the first embodiment of the present invention.

As shown in FIG. 2, the polymerization network of the photo-polymerizable monomers may reflect laevorotatory visible light bands, and hence the region on the liquid crystal layer corresponding to the light permeable region of the photo mask 3 may reflect the laevorotatory visible light bands.

The UV-polymerized liquid crystal cell is placed on a heating platform (for heating), so that the heat-polymerizable monomers in the liquid crystal mixtures are polymerized. The temperature of the heating platform may be 80° C., and the heat curing time may be 45 minutes. The polymerization network obtained by curing the heat-polymerizable monomers may form a region which may reflect dextrorotatory visible light bands.

As shown in FIG. 3, the patterned phase delay film is finally formed which may reflect the laevorotatory polarized light and dextrorotatory polarized light at different positions. The laevorotatory and dextrorotatory polarization films are separated from each other and distributed at intervals in accordance with the shape of the photo mask, so that the polarization films can convert the linear polarized lights of the same polarization state emitted from the adjacent pixel lines of the display panel into the laevorotatory circular polarized lights and dextrorotatory circular polarized lights respectively.

Moreover, the concentration gradients of the polymer networks are formed at different regions (the covered region and exposed region of the mask), i.e., helical pitch gradients of a cholesteric liquid crystal composite system.

Figure 4:
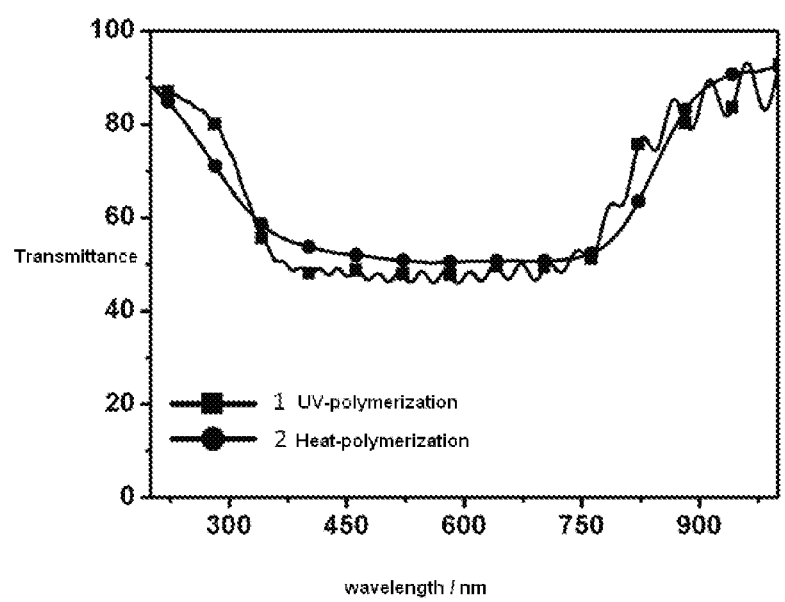
FIG. 4 is a curve diagram of the transmittance of the patterned phase delay film formed in the first embodiment of the present invention in the range of wavelength of 350 nm-750 nm.

The film obtained by the two-step polymerization process is subjected to a spectrum test, and the result is as shown in FIG. 4. Curve 1 is the spectrum curve of the portion obtained by UV-polymerization, which may implement the selective reflection of laevorotatory light in the waveband range of 350 nm-750 nm. Curve 2 is the spectrum curve of the portion obtained by heat-polymerization, which may implement the selective reflection of dextrorotatory light in the waveband range of 350 nm-750 nm.

Embodiment 2

The present embodiment provides the liquid crystal composition which comprises the laevorotatory photo-polymerizable liquid crystal mixture and the dextrorotatory heat-polymerizable liquid crystal mixture. The amounts of the components contained in the two mixtures as well as their mixing mass ratio are shown in Table 1, wherein the total mass of the photo-polymerizable liquid crystal mixture is 1.43 gram, and the total mass of the heat-polymerizable liquid crystal mixture is 0.57 gram.

The laevorotatory photo-polymerizable liquid crystal mixture may comprise SLC1717 as the small molecule nematic liquid crystal, the photo-polymerizable liquid crystal monomers having the molecular formula of:

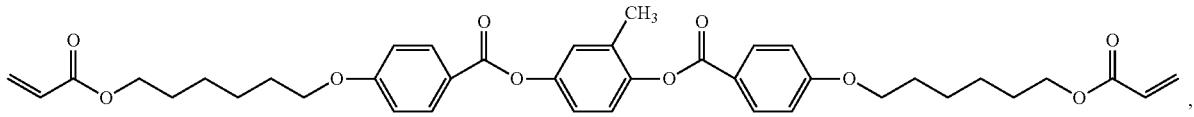

the UV-absorbing dye having the molecular formula of:

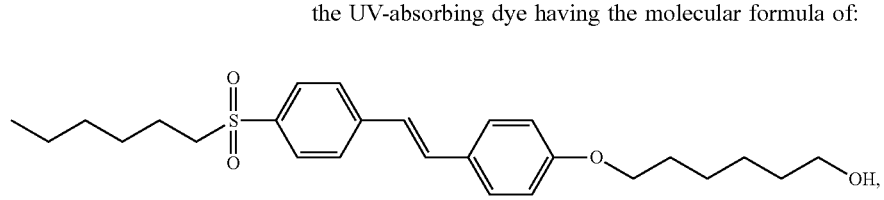

the chiral additive having the molecular formula of:

and
the photoinitiator having the molecular formula of:

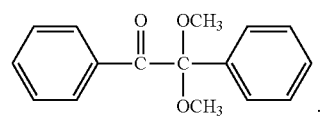 [SMILES: COC(OC)(C(=O)c1ccccc1)c1ccccc1]

The dextrorotatory heat-polymerizable liquid crystal mixture may comprise SLC1717 (Shijiazhuang Yongshenghuaqing Liquid Crystal LTD.) as the small molecule nematic liquid crystal, a bisphenol F epoxy resin as the heat-polymerizable monomer having the following molecular formula:

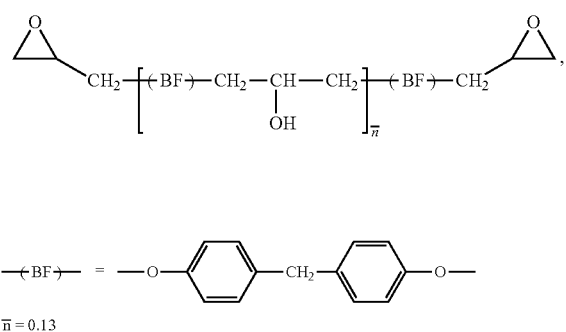

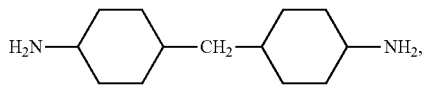
$\bar{n} = 0.13$ 4,4'-diaminodicyclohexylmethane as the curing agent having the following molecular formula:

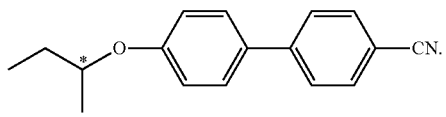 [SMILES: CCC(C)Oc1ccc(-c2ccc(C#N)cc2)cc1]

and
a chiral additive having the following molecular formula:

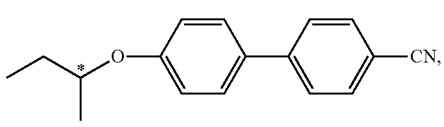

From such the liquid crystal composition, the patterned phase-delay film may be prepared according to the same preparation process as in the first embodiment with the differences that the wavelength of the UV irradiation is 365 nm, the UV light intensity is 100 mW/cm², the duration of UV irradiation is 5 minutes, the temperature of the heating platform is 40° C., and the heat curing time is 50 minutes.

The spectrogram of the patterned phase-delay film obtained after the two-step polymerization is similar to FIG. 4.

Embodiment 3

The present embodiment provides the liquid crystal composition which comprises the laevorotatory photo-polymerizable liquid crystal mixture and the dextrorotatory heat-polymerizable liquid crystal mixture. The amounts of the components contained in the two mixtures as well as their mixing mass ratio are shown in Table 1, wherein the total mass of the photo-polymerizable liquid crystal mixture is 0.67 gram, and the total mass of the heat-polymerizable liquid crystal mixture is 1.33 gram.

The laevorotatory photo-polymerizable liquid crystal mixture may comprise SLC1717 as the small molecule nematic liquid crystal, the photo-polymerizable liquid crystal monomers having the molecular formula of:

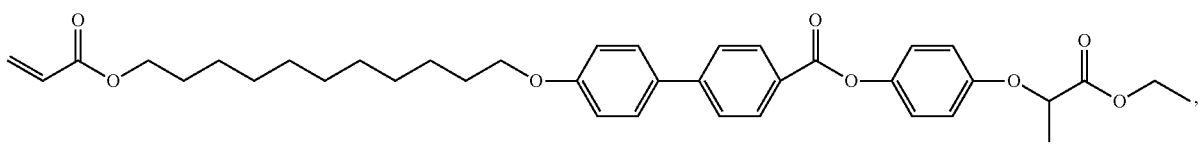 [SMILES: C=CC(=O)OCCCCCCCCCCCOc1ccc(-c2ccc(C(=O)Oc3ccc(OC(C)C(=O)OCC)cc3)cc2)cc1]

the UV-absorbing dye having the molecular formula of:

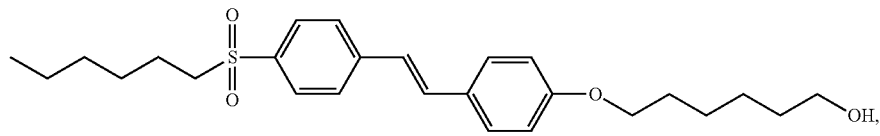 [SMILES: CCCCCCS(=O)(=O)c1ccc(/C=C/c2ccc(OCCCCCCO)cc2)cc1]

the chiral additive having the molecular formula of:

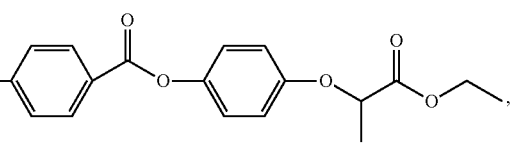

and
the photoinitiator having the molecular formula of:

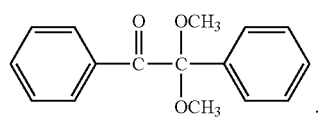 [SMILES: COC(OC)(C(=O)c1ccccc1)c1ccccc1]

The dextrorotatory heat-polymerizable liquid crystal mixture may comprise SLC1717 as the small molecule nematic liquid crystal, a bisphenol F epoxy resin as the heat-polymerizable monomer having the following molecular formula:

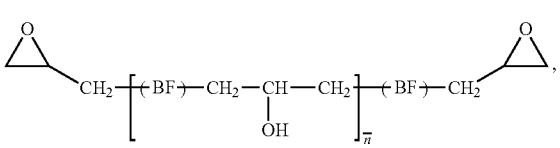

-continued

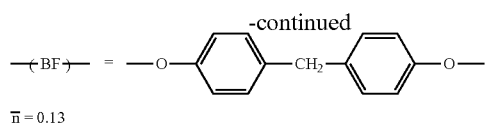

$\overline{n} = 0.13$ 4,4'-diaminodicyclohexylmethane as the curing agent having the following molecular formula:

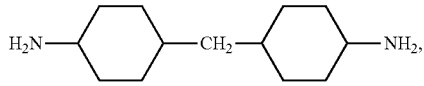

and
the chiral additive having the following molecular formula:

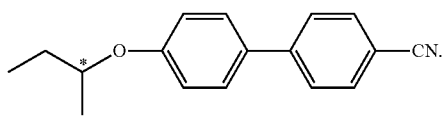 [SMILES: CCC(C)Oc1ccc(-c2ccc(C#N)cc2)cc1]

From such the liquid crystal composition, the patterned phase delay film may be prepared according to the same preparation process as in the first embodiment with the differences that the wavelength of the UV irradiation is 365 nm, the UV light intensity is 30 mW/cm², the duration of UV irradiation is 90 minutes, the temperature of the heating platform is 50° C., and the heat curing time is 40 minutes.

The spectrogram of the patterned phase-delay film obtained after the two-step polymerization is similar to FIG. 4.

Embodiment 4

The present embodiment provides the liquid crystal composition which comprises the laevorotatory photo-polymerizable liquid crystal mixture and the dextrorotatory heat-polymerizable liquid crystal mixture. The amounts of the components contained in the two mixtures as well as their mixing mass ratio are shown in Table 1, wherein the total mass of the photo-polymerizable liquid crystal mixture is 0.5 gram, and the total mass of the heat-polymerizable liquid crystal mixture is 1.5 gram.

The laevorotatory photo-polymerizable liquid crystal mixture may comprise SLC1717 as the small molecule nematic liquid crystal, the photo-polymerizable liquid crystal monomers having the molecular formula of:

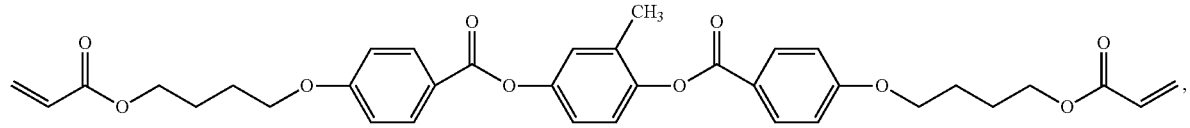

the UV-absorbing dye having the molecular formula of:

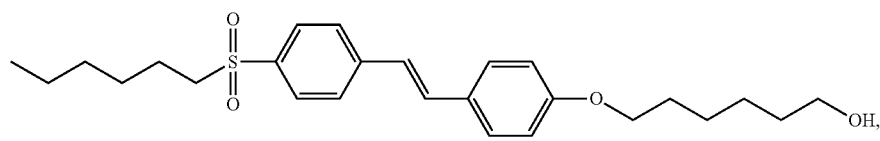 [SMILES: CCCCCCS(=O)(=O)c1ccc(/C=C/c2ccc(OCCCCCCO)cc2)cc1]

the chiral additive having the molecular formula of:

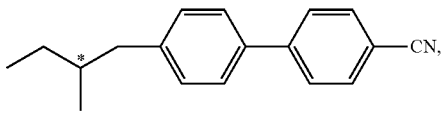

and
the photoinitiator having the molecular formula of:

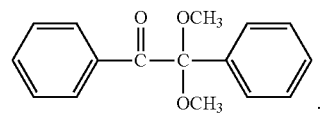 [SMILES: COC(OC)(C(=O)c1ccccc1)c1ccccc1]

The dextrorotatory heat-polymerizable liquid crystal mixture may comprise SLC1717 as the small molecule nematic liquid crystals, the polyethylene glycol bisglycidyl ether as the heat-polymerizable monomer having the following molecular formula:

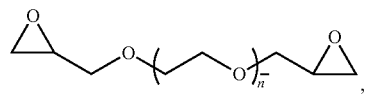

$\overline{n} = 3.45$ 1,8-diamino-3,6-dioxaoctane as the curing agent having the following molecular formula:

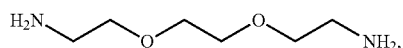

and
the chiral additive having the following molecular formula:

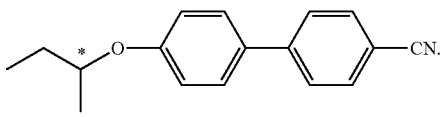 [SMILES: CCC(C)Oc1ccc(-c2ccc(C#N)cc2)cc1]

From such the liquid crystal composition, the patterned phase delay film may be prepared according to the same preparation process as in the first embodiment with the differences that the wavelength of the UV irradiation is 365 nm, the UV light intensity is 60 mW/cm², the duration of UV irradiation is 60 minutes, the temperature of the heating platform is 70° C., and the heat curing time is 35 minutes.

The spectrogram of the patterned phase-delay film obtained after the two-step polymerization is similar to FIG. 4.

Embodiment 5

The present embodiment provides the liquid crystal composition which comprises the laevorotatory photo-polymerizable liquid crystal mixture and the dextrorotatory heat-polymerizable liquid crystal mixture. The amounts of the components contained in the two mixtures as well as their mixing mass ratio are shown in Table 1, wherein the total mass of the photo-polymerizable liquid crystal mixture is 1.11 gram, and the total mass of the heat-polymerizable liquid crystal mixture is 0.89 gram.

The laevorotatory photo-polymerizable liquid crystal mixture may comprise SLC1717 as the small molecule nematic liquid crystals, the photo-polymerizable liquid crystal monomers having the molecular formula of:

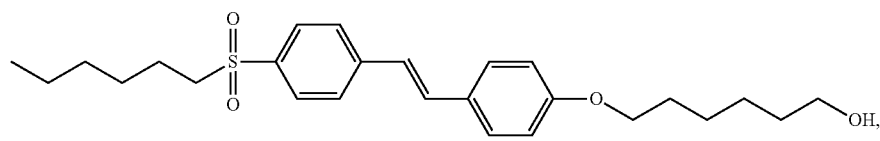

the UV-absorbing dye having the molecular formula of:

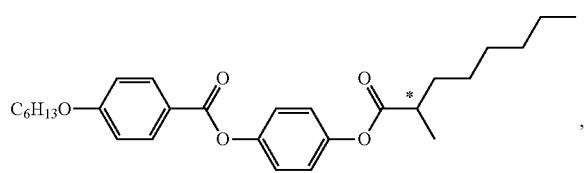

the chiral additive having the molecular formula of:

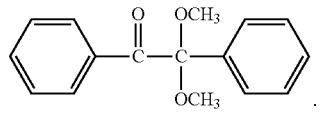

and
the photoinitiator having the molecular formula of:

The dextrorotatory heat-polymerizable liquid crystal mixture may comprise SLC1717 as the small molecule nematic liquid crystal, the polyethylene glycol bisglycidyl ether as the heat-polymerizable monomer having the following molecular formula:

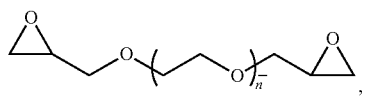

1,8-diamino-3,6-dioxaoctane as the curing agent having the following molecular formula:

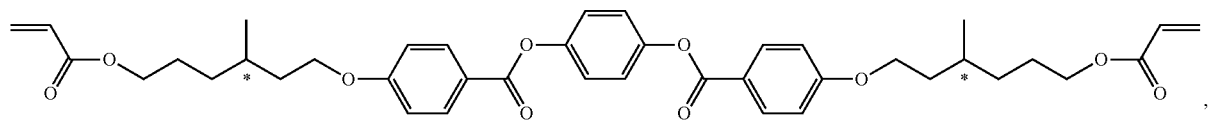 [SMILES: C=CC(=O)OCCCC(C)CCOc1ccc(C(=O)Oc2ccc(OC(=O)c3ccc(OCCC(C)CCCOC(=O)C=C)cc3)cc2)cc1]

and
the chiral additive having the following molecular formula:

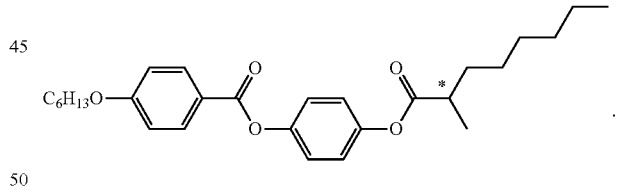

From such the liquid crystal composition, the patterned phase delay film may be prepared according to the same preparation process as in the first embodiment with the differences that the wavelength of the UV irradiation is 365 nm, the UV light intensity is 0.001 mW/cm², the duration of UV irradiation is 240 minutes, the temperature of the heating platform is 30° C., and the heat curing time is 60 minutes.

The spectrogram of the patterned phase-delay film obtained after the the two-step polymerization is similar to FIG. 4.

Embodiment 6

The present embodiment provides the liquid crystal composition which comprises the laevorotatory photo-polymerizable liquid crystal mixture and the dextrorotatory heat-polymerizable liquid crystal mixture. The amounts of the components contained in the two mixtures as well as their mixing mass ratio are shown in Table 1, wherein the total mass of the photo-polymerizable liquid crystal mixture is 0.57 gram, and the total mass of the heat-polymerizable liquid crystal mixture is 1.43 gram.

The laevorotatory photo-polymerizable liquid crystal mixture may comprise SLC1717 as the small molecule nematic liquid crystal, the photo-polymerizable liquid crystal monomers having the molecular formula of:

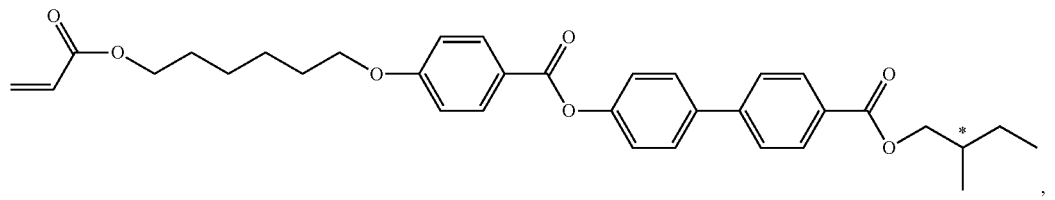 [SMILES: C=CC(=O)OCCCCCCOc1ccc(C(=O)Oc2ccc(-c3ccc(C(=O)OCC(C)CC)cc3)cc2)cc1]

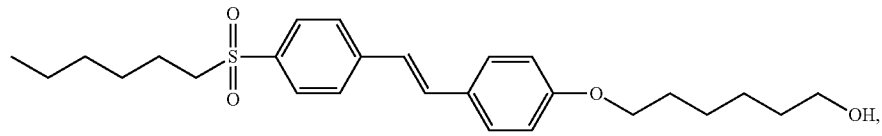 [SMILES: CCCCCCS(=O)(=O)c1ccc(/C=C/c2ccc(OCCCCCCO)cc2)cc1]

the UV-absorbing dye having the molecular formula of:

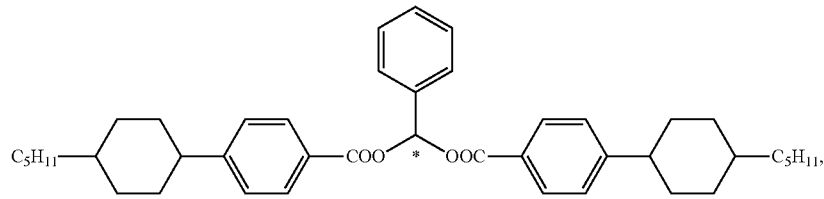

the chiral additive having the molecular formula of:

and
the photoinitiator having the molecular formula of:

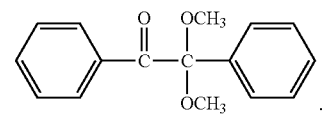

The dextrorotatory heat-polymerizable liquid crystal mixture may comprise SLC1717 as the small molecule nematic liquid crystal, the polyethylene glycol bisglycidyl ether as the heat-polymerizable monomers having the following molecular formula:

1,8-diamino-3,6-dioxaoctane as the curing agent having the following molecular formula:

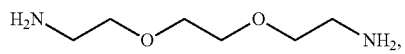

and
the chiral additive having the following molecular formula:

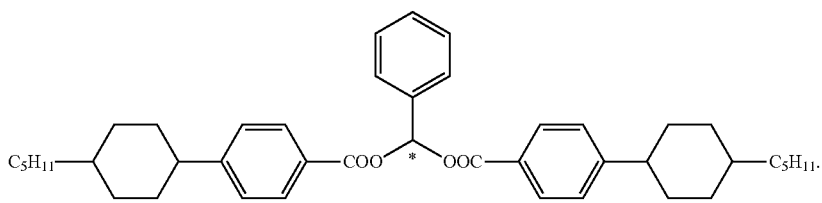

From such the liquid crystal composition, the patterned phase delay film may be prepared according to the same preparation process as in the first embodiment with the differences that the wavelength of the UV irradiation is 365 nm, the UV light intensity is 80 mW/cm², the duration of UV irradiation is 30 minutes, the temperature of the heating platform is 100° C., and the heat curing time is 25 minutes.

The spectrogram of the patterned phase-delay film obtained after the two-step polymerization is similar to FIG. 4.

Table 1 shows the mass ratios of the photo-polymerizable mix liquid crystals and heat-polymerizable mix liquid crystals as well as the mixing ratios in the above embodiments.

TABLE 1

|  | Embodiment 1 | Embodiment 2 | Embodiment 3 | Embodiment 4 | Embodiment 5 | Embodiment 6 | Embodiment 7 |
|---|---|---|---|---|---|---|---|
| Photo-polymerizable mix liquid crystal | | | | | | | |
| Small molecule nematic liquid crystal (%) | 28 | 69.5 | 42 | 60 | 53 | 35 | 46 |
| Photo-polymerizable crystal monomer (%) | 40 | 27.9 | 28 | 26 | 15 | 35 | 24 |
| UV-absorbing dye (%) | 2 | 2 | 15 | 10 | 8 | 5 | 5 |
| Chiral additive (%) | 25 | 0.1 | 12 | 3 | 20 | 23 | 23 |
| Photoinitiator (%) | 5 | 0.5 | 3 | 1 | 4 | 2 | 2 |
| Heat-polymerizable mix liquid crystal | | | | | | | |
| Small molecule nematic liquid crystal (%) | 35 | 73 | 45 | 55 | 65 | 70 | 49 |
| Heat-polymerizable monomer (%) | 20 | 10 | 15 | 18 | 12 | 11 | 17 |
| Curing agent (%) | 20 | 12 | 16 | 17 | 18 | 13 | 16 |
| Chiral additive (%) | 25 | 5 | 24 | 10 | 5 | 6 | 18 |
| Mass ratios of photo-polymerizable mix liquid crystals to heat-polymerizable mix liquid crystals | 1:1 | 1:0.4 | 1:2 | 1:3 | 1:0.8 | 1:2.5 | 1:1.5 |

It should be understood that the above embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

What is claimed is:

1. A method for preparing a patterned phase delay film comprising the steps of:
   injecting a liquid crystal composition into a liquid crystal cell;
   irradiating the liquid crystal cell partially covered with a photo mask with UV light to complete UV-polymerization; and
   heating the liquid crystal cell to complete heat-polymerization,
   wherein the liquid crystal composition comprises a photo-polymerizable liquid crystal mixture and a heat-polymerizable liquid crystal mixture, wherein the photo-polymerizable liquid crystal mixture and heat-polymerizable liquid crystal mixture have opposite rotatory directions,
   wherein the photo-polymerizable liquid crystal mixture comprises a small molecule nematic liquid crystal, a photo-polymerizable monomer, a UV-absorbing dye, a chiral additive, and a photoinitiator; and
   wherein the heat-polymerizable liquid crystal mixture comprises a small molecule nematic liquid crystal, a heat-polymerizable monomer, a curing agent, and a chiral additive.

2. The method according to claim 1, wherein a condition for the UV-polymerization is UV light intensity being 0.001-100 mW/cm² and irradiation time being 5-240 min.

3. The method according to claim 1, wherein a condition for the heat-polymerization is temperature being 30-120° C. and heating time being 20-60 min.

4. The method of claim 1, wherein the liquid crystal composition has a mass ratio of the photo-polymerizable liquid crystal mixture to the heat-polymerizable liquid crystal mixture of 1: (0.4-3).

5. The method of claim 1, wherein the photo-polymerizable liquid crystal mixture comprises, by mass percentage, 28-69.5% of the small molecule nematic liquid crystal, 15-40% of the photo-polymerizable monomer, 2-15% of the UV-absorbing dye, 0.1-25% of chiral additive, and 0.5-5% of photoinitiator.

6. The method of claim 1, wherein the photo-polymerizable monomer is selected from the group consisting of:

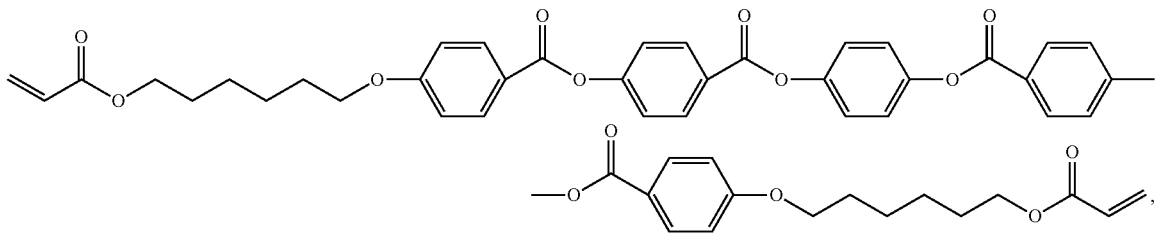

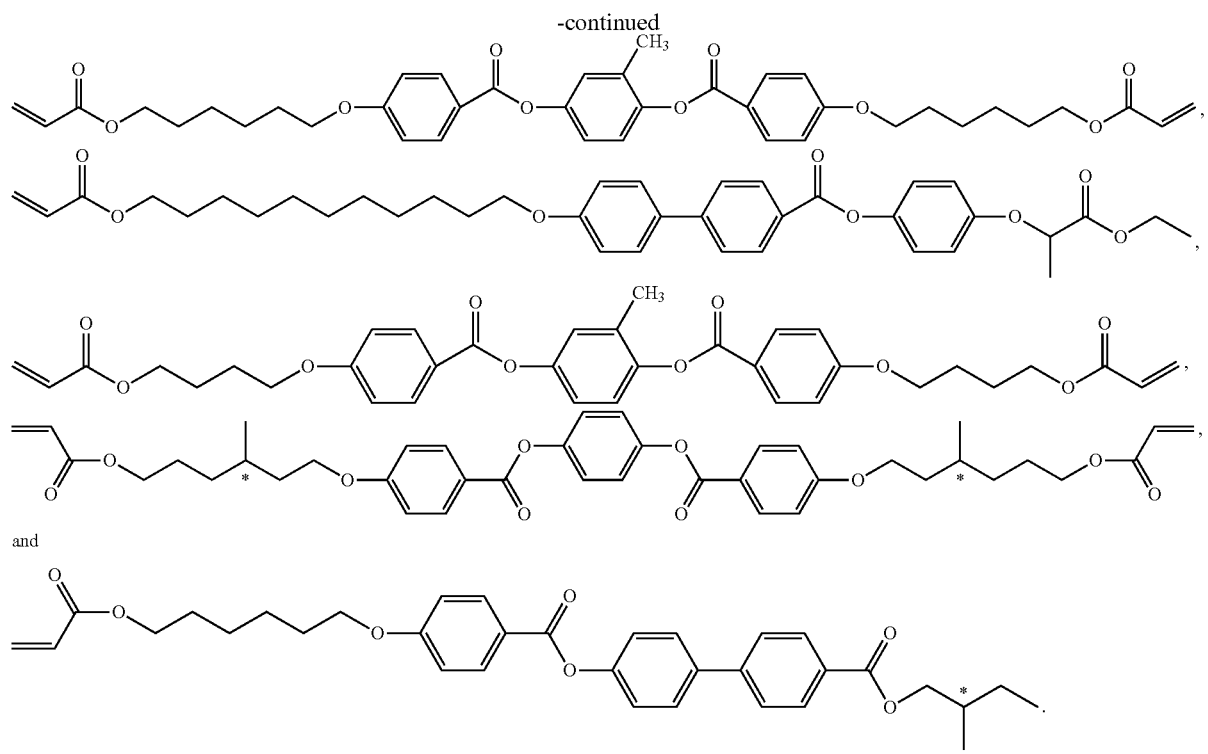

and

7. The method of claim 1, wherein the UV-absorbing dye comprises:

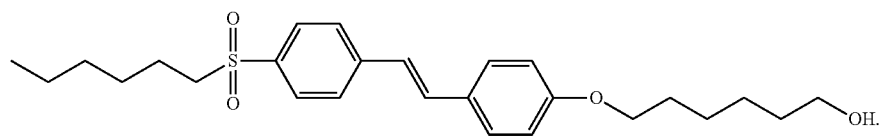 [SMILES: CCCCCCS(=O)(=O)c1ccc(/C=C/c2ccc(OCCCCCCO)cc2)cc1]

8. The method of claim 1, wherein the photoinitiator comprises:

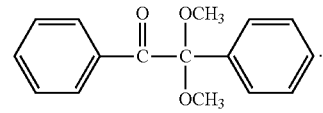 [SMILES: COC(OC)(C(=O)c1ccccc1)c1ccccc1]

-continued

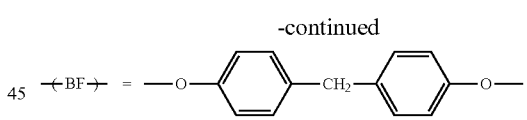

or a polyethylene glycol bisglycidyl ether which has the following molecular formula:

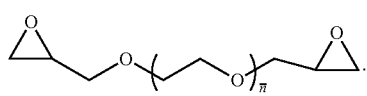

9. The method of claim 1, wherein the heat-polymerizable liquid crystal mixture comprises, by mass percentage, 35-73% of the small molecule nematic liquid crystal, 10-20% of the heat-polymerizable monomer, 12-20% of the curing agent and 5-25% of the chiral additive.

10. The method of claim 1, wherein the heat-polymerizable monomer comprises
a bisphenol F epoxy resin which has the following molecular formula:

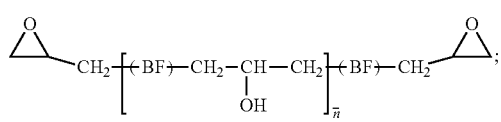

11. The method of claim 1, wherein the curing agent comprises:
1,8-diamino-3,6-dioxaoctane which has the following molecular formula:

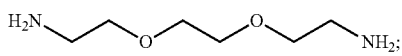
or
4,4'-diaminodicyclohexylmethane which has the following molecular formula:

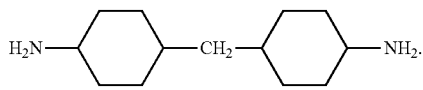 [SMILES: NC1CCC(CC2CCC(N)CC2)CC1]

12. The method of claim 1, wherein the chiral additive is selected from the group consisting of

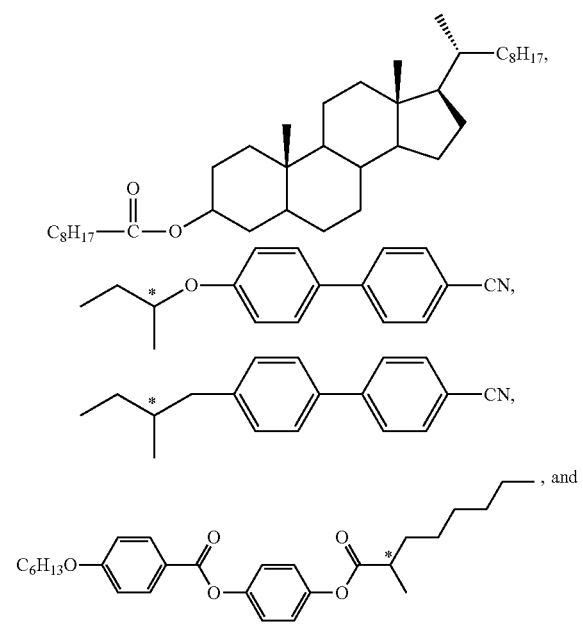
, and

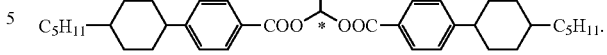

13. A display device comprising a patterned phase-delay film,
wherein the patterned phase delay film is prepared from a liquid crystal composition, and
wherein the liquid crystal composition comprises a photo-polymerizable liquid crystal mixture and a heat-polymerizable liquid crystal mixture, wherein the photo-polymerizable liquid crystal mixture and heat-polymerizable liquid crystal mixture have opposite rotatory directions,
wherein the photo-polymerizable liquid crystal mixture comprises a small molecule nematic liquid crystal, a photo-polymerizable monomer, a UV-absorbing dye, a chiral additive and a photoinitiator; and
wherein the heat-polymerizable liquid crystal mixture comprises a small molecule nematic liquid crystal, a heat-polymerizable monomer, a curing agent and a chiral additive.

14. The display device according to claim 13, wherein the liquid crystal composition has a mass ratio of the photo-polymerizable liquid crystal mixture to the heat-polymerizable liquid crystal mixture of 1: (0.4-3).

15. The display device according to claim 13, wherein the photo-polymerizable liquid crystal mixture comprises, by mass percentage, 28-69.5% of the small molecule nematic liquid crystal, 15-40% of the photo-polymerizable monomer, 2-15% of the UV-absorbing dye, 0.1-25% of the chiral additive and 0.5-5% of the photoinitiator.

16. The display device according to claim 13, wherein the heat-polymerizable liquid crystal mixture comprises, by mass percentage, 35-73% of the small molecule nematic liquid crystal, 10-20% of the heat-polymerizable monomer, 12-20% of the curing agent and 5-25% of the chiral additive.

* * * * *